J. E. ANDREW.
MACHINERY FOR MAKING TREENAILS.
No. 903. Patented Aug. 30, 1838.
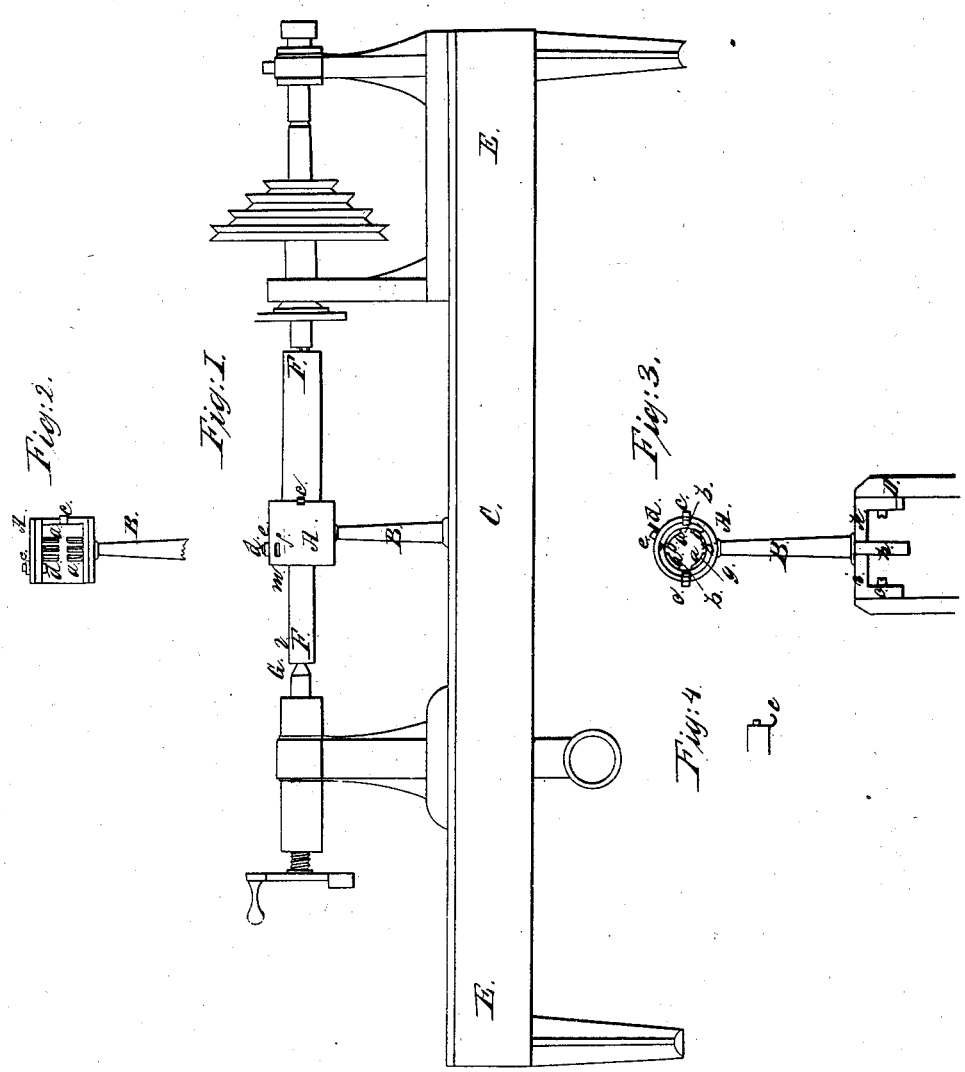

UNITED STATES PATENT OFFICE.

JOSEPH E. ANDREWS, OF BOSTON, MASSACHUSETTS.

MACHINE FOR TURNING TREENAILS, BANNISTERS, RAKE-HANDLES, AND CYLINDRICAL ARTICLES.

Specification of Letters Patent No. 903, dated August 30, 1838.

*To all whom it may concern:*

Be it known that I, JOSEPH E. ANDREWS, of Boston, county of Suffolk, and State of Massachusetts, have invented a new and useful improvement in machinery for making treenails, bannisters, hoe and rake handles, and such other cylindrical articles as may be successfully manufactured by said machinery.

My improvements, the principles thereof and manner in which I have contemplated the application of that principle or character by which it may be distinguished from other inventions, together with such parts, improvements or combinations, I claim as my invention, I have herein set forth and described, which description, taken in connection with the accompanying drawings herein referred to, forms my specification.

The mode of making treenails for ship's use and many other purposes has either been by hand, plane, turning lathe, hollow augur, or other proper instrument. By either of the above methods of preparing the same but very few of good quality could be made by a workman during the day, the expense of manufacturing them, in this manner, being so great, as to prevent their use in the construction of vessels, to that degree, which is desirable. By my improved machinery I am enabled to make a much greater number of very perfect treenails, in the same time, and at a proportionably less expense.

Figures 1, 2, 3, 4 represent my improvements. Fig. 1, is a side view. Fig. 2, is a section, and Fig. 3, an end view.

A, Figs. 1, 2, 3, is a hollow cylinder attached to, and resting on a column or other proper support B. In the interior of this hollow cylinder a female screw thread, $a, a$, Figs. 2, 3 is formed in a similar manner to that of a common die for cutting metallic screws. It may have one, two, three, four, or more scores $b, b, b, b$, or interruptions of the thread, for the purpose of causing it to cut its way, while forming a male screw on any cylinder. $c, c$, are hooked cutters affixed in a suitable manner to one edge or end of the cylinder. These cutters may be shaped as represented in Figs. 1, 2, 3, 4, or otherwise properly formed to answer their intended purpose. On the opposite side of the screw $a$ $a$ a cutter $d$, shaped like a common chisel, or the iron of a smoothing plane, is inserted in the circumference of the cylinder A and confined therein by a wedge $e$. Directly in front of this cutter is a slot or opening $f$, Fig. 1, through which the shavings or wood removed by the cutter $d$, pass as they are formed. At $g$, Fig. 3, another rectangular slot or opening similar to $f$ should be formed of the breadth of the screw $a$ $a$, through which opening the chips or shavings made by the operations of the screw may fall, as they are produced.

The foot of the column B, slides freely in a longitudinal direction between two cheeks $i, k$, Fig. 3, connected to the side bars C, D, of the lathe, or instead of the above any other suitable apparatus may be attached to the lower part of the column B.

The whole of the above described machinery may be connected to a common turning lathe E, E, as represented in Fig. 1, or to any other suitable machinery.

The piece of wood F, F, from which the treenail or other cylindrical body is to be shaped is inserted in the lathe as seen in Fig. 1. The cylinder A before it commences its operations is slid over the center G. The lathe being put in action the piece of wood, F, F, is revolved with any proper degree of velocity, and while in motion, the hooked cutters $c, c$, remove the corners of the wood and reduce it to a cylinder. At the sime time the female screw $a, a$, cuts a thread on this cylinder and causes the cylinder A to advance toward the opposite end of the piece of wood F, F. As the cylinder A, progresses that portion of the screw thread, which the screw $a, a$, leaves behind it, is removed by the cutter $d$, thus forming the treenail or cylinder $l$ $m$, Fig. 1, of any required length.

Instead of the screw $a$ $a$ a proper cutter shaped similar to a common chase for cutting screws, or otherwise properly formed may be inserted in a suitable manner in the circumference of the cylinder A.

I claim as my invention—

A cylinder A or other proper shaped body with screws and cutters constructed and operating as I have described, and for the purposes herein above mentioned.

In testimony that the above is a true description of my invention and improvements, I have hereto set my hand this twenty-sixth day of June, in the year eighteen hundred and thirty-eight.

J. E. ANDREWS. [L. S.]

Witnesses:
R. H. EDDY,
EZRA LINCOLN, Jr.